«12» United States Patent
Tamura et al.

(10) Patent No.: US 7,633,180 B2
(45) Date of Patent: Dec. 15, 2009

(54) ELECTRONIC APPARATUS AND STARTING METHOD OF THE ELECTRONIC APPARATUS

(75) Inventors: Takeshi Tamura, Kanagawa (JP); Katsuhisa Yamamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 381 days.

(21) Appl. No.: 11/802,887

(22) Filed: May 25, 2007

(65) Prior Publication Data

US 2007/0291435 A1    Dec. 20, 2007

(30) Foreign Application Priority Data

Jun. 19, 2006   (JP) ............................. 2006-169431
Feb. 26, 2007   (JP) ............................. 2007-045693

(51) Int. Cl.
*H02J 1/10*    (2006.01)
*H02J 3/00*    (2006.01)
*H02J 3/14*    (2006.01)

(52) U.S. Cl. ...................................................... 307/29

(58) Field of Classification Search .................. 307/29, 307/41, 81; 713/1, 2
See application file for complete search history.

(56) References Cited

U.S. PATENT DOCUMENTS 6,297,945 B1    10/2001    Yamamoto et al.

FOREIGN PATENT DOCUMENTS

JP    3186671    5/2001
JP    3267232    1/2002

*Primary Examiner*—Fritz M Fleming
*Assistant Examiner*—Dru M Parries
(74) *Attorney, Agent, or Firm*—Dickstein Shapiro LLP

(57) ABSTRACT

A starting method of an electronic apparatus wherein power supplies of a plurality of the electronic apparatuses are started in order, the starting method includes the steps of resetting the electronic apparatuses when each of the electronic apparatuses is started; and canceling the resets of the electronic apparatuses at the substantially same time after a power supply started last among power supplies of the plural electronic apparatuses is started.

8 Claims, 13 Drawing Sheets

PROGRAM FOR SETTING THE SECOND
DESIGNATED TIME BASED ON THE FIRST
DESIGNATED TIME DEFINED BY RANDOM NUMBER

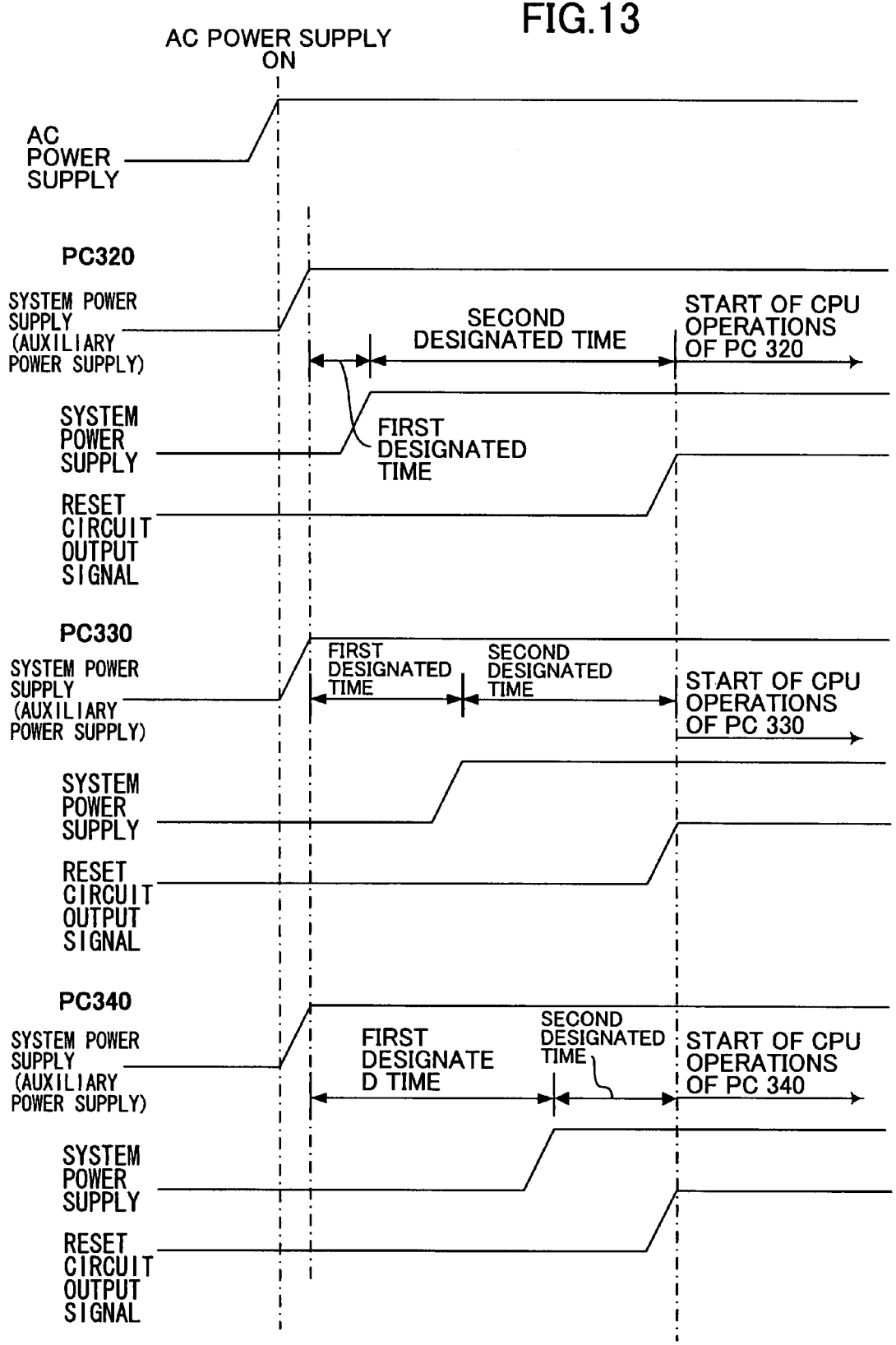

ELECTRONIC APPARATUS AND STARTING METHOD OF THE ELECTRONIC APPARATUS

BACKGROUND OF THE INVENTION

1. Field of the Invention

The present invention generally relates to electronic apparatuses and starting methods of the electronic apparatuses, and more specifically, to an electronic apparatus such as a computer used in a state where plural of the electronic apparatuses are connected and a starting method of the electronic apparatus.

2. Description of the Related Art

In a case where plural electronic apparatuses such as computers are connected to the same switching power supply, if the power of each of the electronic apparatuses is simultaneously turned on, a rush current is generated.

In the related art cases, a method for shifting timings for power-on to the electronic apparatuses in order to prevent trouble with the power supply due to the rush current or generation of problems in the electronic apparatus due to voltage drop is suggested.

Here, the timings for power-on to the electronic apparatuses of the related art electronic apparatus are discussed.

FIG. 1 is a functional block diagram of a related art electronic apparatus 100.

The electronic apparatus 100 includes a power supply 110, an electronic apparatus control part 120, a power supply control part 130, a reset circuit part 140, and a backup battery 150. The power supply 110 includes a main power supply 111 and an auxiliary power supply 112. A process implemented by the electronic apparatus 100 is controlled by the electronic apparatus control part 120.

The power supply control part 130 makes the auxiliary power supply 112 work as a power supply when starting or shutting off the main power supply 111 is controlled. The reset circuit part 140 resets the electronic apparatus control part 120. The backup battery 150 holds setting information having been set in advance.

The main power supply 111 operates the electronic apparatus control part 120 and makes the electronic apparatus 100 function as an electronic apparatus. The auxiliary power supply 112 is used for controlling starting or shutting off the main power supply 111.

FIG. 2 is a timing chart for explaining timing of power-on to the electronic apparatus 100 and other electronic apparatuses in the related art case. Here, "power-on" means a state where the main power supply is started so that the electronic apparatus 100 can function as an electronic apparatus.

In the electronic apparatus 100, the power supply part 110 starts the auxiliary power supply 112 when an AC power supply is supplied from outside, so as to immediately supply the auxiliary power supply 112 to the power supply control part 130.

The power supply control part 130 outputs a main power supply control signal to the power supply part 110 so that the main power supply 111 is started after a time set in advance passes.

The reset circuit 140 is set in advance so as to reset the electronic apparatus control part 120 until the main power supply 111 is supplied. When the main power supply 111 is started and the main power supply 111 is supplied to the reset circuit part 140, a reset cancel signal for canceling this reset is output so that the reset of the electronic apparatus control part 120 is canceled.

In the related art, in a case where plural electronic apparatuses having the above-mentioned structures are connected, a different value of a time from starting the auxiliary power supply 112 to starting the main power supply 111 is set for every electronic apparatus, so that timing for power-on at each of the electronic apparatuses is shifted relative to the other electronic apparatuses.

For example, as shown in FIG. 2, a time for starting the main power supply at each of the electronic apparatus 100, the electronic apparatus 100A, and the electronic apparatus 100B is made gradually longer so that the electric power is powered-on to the electronic apparatus 100, the electronic apparatus 100A, and the electronic apparatus 100B in this order.

The following documents, in addition to the above-discussed method, pertain to the related arts.

Japanese Patent No. 3186671 describes sequentially turned-on power supply equipment which makes it possible to automatically and sequentially delay the turn-on time of a plurality of power circuits to a load and thereby make a delayed supply of power to the load, by installing a timer before a main power supply of each of these same-type power circuits, and allowing them to automatically recognize and set a timer value.

Japanese Patent No. 3267232 describes a power supply control method and power supply control device for reduction of rush current to suppress an excessive rush current which is generated by the addition of rush currents, when the power supplies of a plurality of power supply apparatuses are turned on at the same time.

However, in the above-mentioned related art cases, since timings of power-on are shifted, a difference of starting times is generated between an electronic apparatus started earlier and an electronic apparatus started later.

For example, in a system where such electronic apparatuses are operated with plural of the apparatuses being connected, operations of each of the electronic apparatuses or the entirety of the system are unstable due to the above-mentioned time difference.

SUMMARY OF THE INVENTION

Accordingly, embodiments of the present invention may provide a novel and useful electronic apparatus and starting method of the electronic apparatus solving one or more of the problems discussed above.

More specifically, the embodiments of the present invention may provide an electronic apparatus and a starting method of the electronic apparatus wherein, in a case where electric power is powered-on to plural connected electronic apparatuses in order, unstable operations generated due to shift of starting time of each of the electronic apparatuses can be avoided.

One aspect of the present invention may be to provide a starting method of an electronic apparatus wherein power supplies of a plurality of the electronic apparatuses are started in order, the starting method including the steps of: resetting the electronic apparatuses when each of the electronic apparatuses is started; and canceling the resets of the electronic apparatuses at the substantially same time after a power supply started last among power supplies of the plural electronic apparatuses is started.

Another aspect of the present invention may be to provide an electronic apparatus, including: a power supply part having a main power supply and an auxiliary power supply; a power supply control part having the auxiliary power supply as a power supply, the auxiliary power supply being configured to control starting or shutting of the main power supply;

an electronic apparatus control part configured to control the electronic apparatus; a reset part configured to reset the electronic apparatus control part at the starting time of the auxiliary power supply; and a storage part where a first designated time being set for every electronic apparatus and a second designated time that is the same as that of other electronic apparatuses are stored; wherein the power supply control part starts the main power supply after the first designated time passes from the starting time of the auxiliary power supply; and the reset part cancels the reset after the second designated time passes from the starting time of the auxiliary power supply.

Other aspect of the present invention may be to provide an electronic apparatus, including: a power supply part having a main power supply and an auxiliary power supply; a power supply control part having the auxiliary power supply as a power supply, the auxiliary power supply being configured to control starting or shutting off the main power supply; an electronic apparatus control part configured to control the electronic apparatus; a reset part configured to reset the electronic apparatus control part at the starting time of the auxiliary power supply; and a storage part where a first designate time being set for every electronic apparatus and a second designated time are stored; wherein the sum of the first designated time and the second designated time is the same as those of other electronic apparatuses; the power supply control part starts the main power supply after the first designated time passes from the starting time of the auxiliary power supply; and the reset part cancels the reset after the second designated time passes from the starting time of the main power supply.

Other aspect of the present invention may be to provide a starting method of an electronic apparatus, the electronic apparatus including: a power supply part having a main power supply and an auxiliary power supply; an electronic apparatus control part configured to control the electronic apparatus; and a storage part where a first designated time being set for every the electronic apparatus and a second designate time that is the same as that of other electronic apparatus are stored; the starting method including a power supply controlling step of controlling starting or shutting off the main power supply; a resetting step of resetting the electronic apparatus control part at the starting time of the auxiliary power supply; wherein, in the power supply controlling step, the main power supply is started after the first designated time passes from the starting time of the auxiliary power supply; and in the resetting step, the reset is canceled after the second designated time passes from the starting time of the auxiliary power supply.

Other aspect of the present invention may be to provide a starting method of an electronic apparatus, the electronic apparatus including a power supply part having a main power supply and an auxiliary power supply; an electronic apparatus control part configured to control the electronic apparatus; and a storage part where a first designated time being set for every the electronic apparatus and a second designate time that is the same as that of other electronic apparatus are stored; the starting method including a power supply controlling step of controlling starting or shutting off the main power supply; a resetting step of resetting the electronic apparatus control part at the starting time of the auxiliary power supply; wherein, in the power supply controlling step, the main power supply is started after the first designated time passes from the starting time of the main power supply; and in the resetting step, the reset is canceled after the second designated time passes from the starting time of the auxiliary power supply.

According to the embodiments of the present invention, it is possible to provide an electronic apparatus and a starting method of the electronic apparatus wherein, in a case where electric power is powered-on to plural connected electronic apparatuses in order, unstable operations generated due to shift of starting time of each of the electronic apparatuses can be avoided.

Other objects, features, and advantages of the present invention will be come more apparent from the following detailed description when read in conjunction with the accompanying drawings.

BRIEF DESCRIPTION OF THE DRAWINGS

FIG. 13 is a timing chart for explaining timings of starting the PC 320, the PC 330, and the PC 340 of the second embodiment of the present invention.

DETAILED DESCRIPTION OF THE PREFERRED EMBODIMENTS

A description is given below, with reference to the FIG. 3 through FIG. 13 of embodiments of the present invention.

In embodiments of the present invention, in a case where electric supplies are powered-on to plural electronic apparatuses connected to a single power supply, when each of the power supplies is started, the electronic apparatus is reset. After a power supply started last is started, resets of plural electronic apparatuses are simultaneously canceled. As a result of this, after all of the electronic apparatuses become stable, operations of the electronic apparatuses can be simultaneously started.

First Embodiment of the Present Invention

Figure 1:
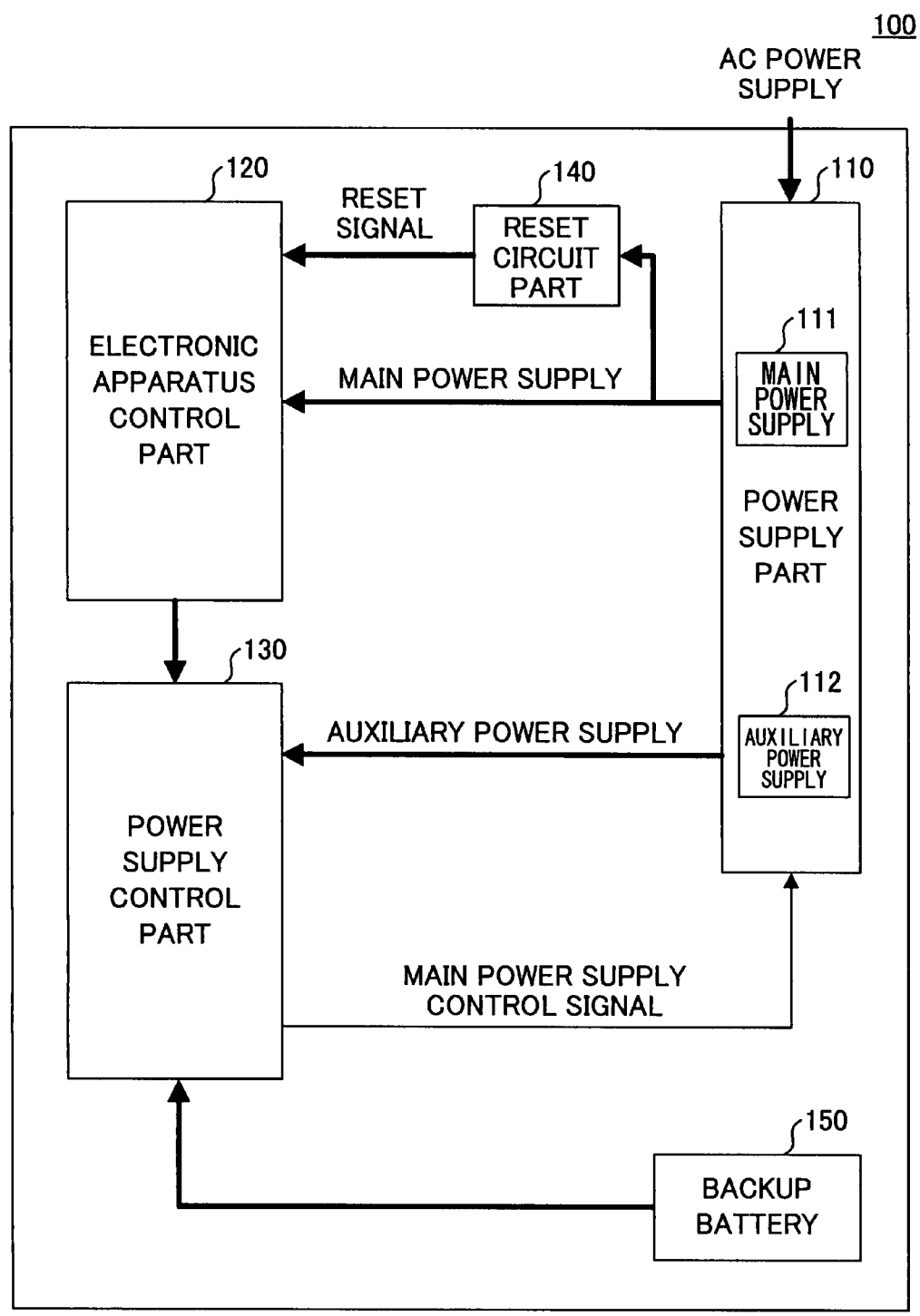
FIG. 1 is a functional block diagram of a related art electronic apparatus 100.
Figure 2:
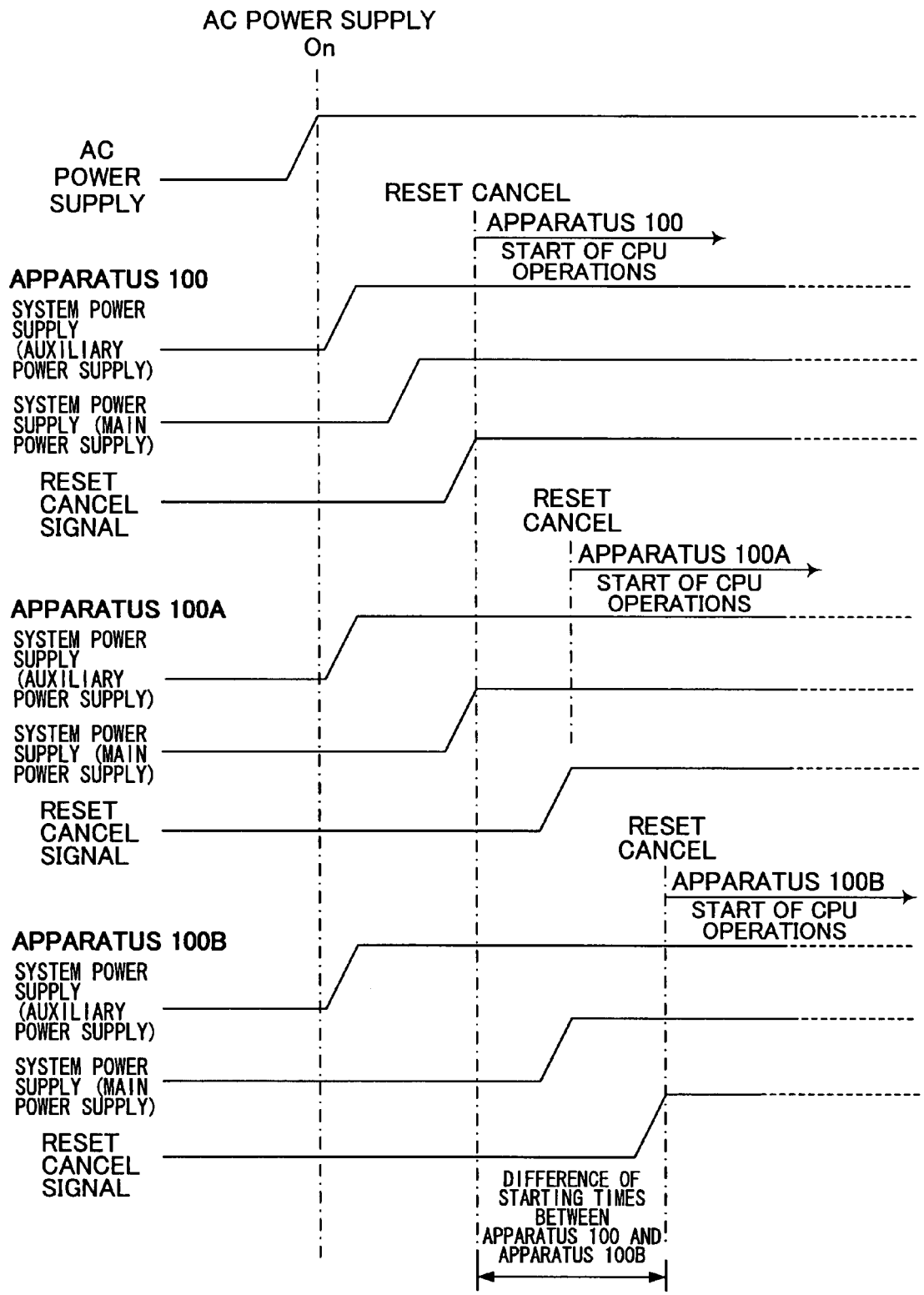
FIG. 2 is a timing chart for explaining timing of power-on to the electronic apparatus 100 and other electronic apparatuses in the related art case.
Figure 3:
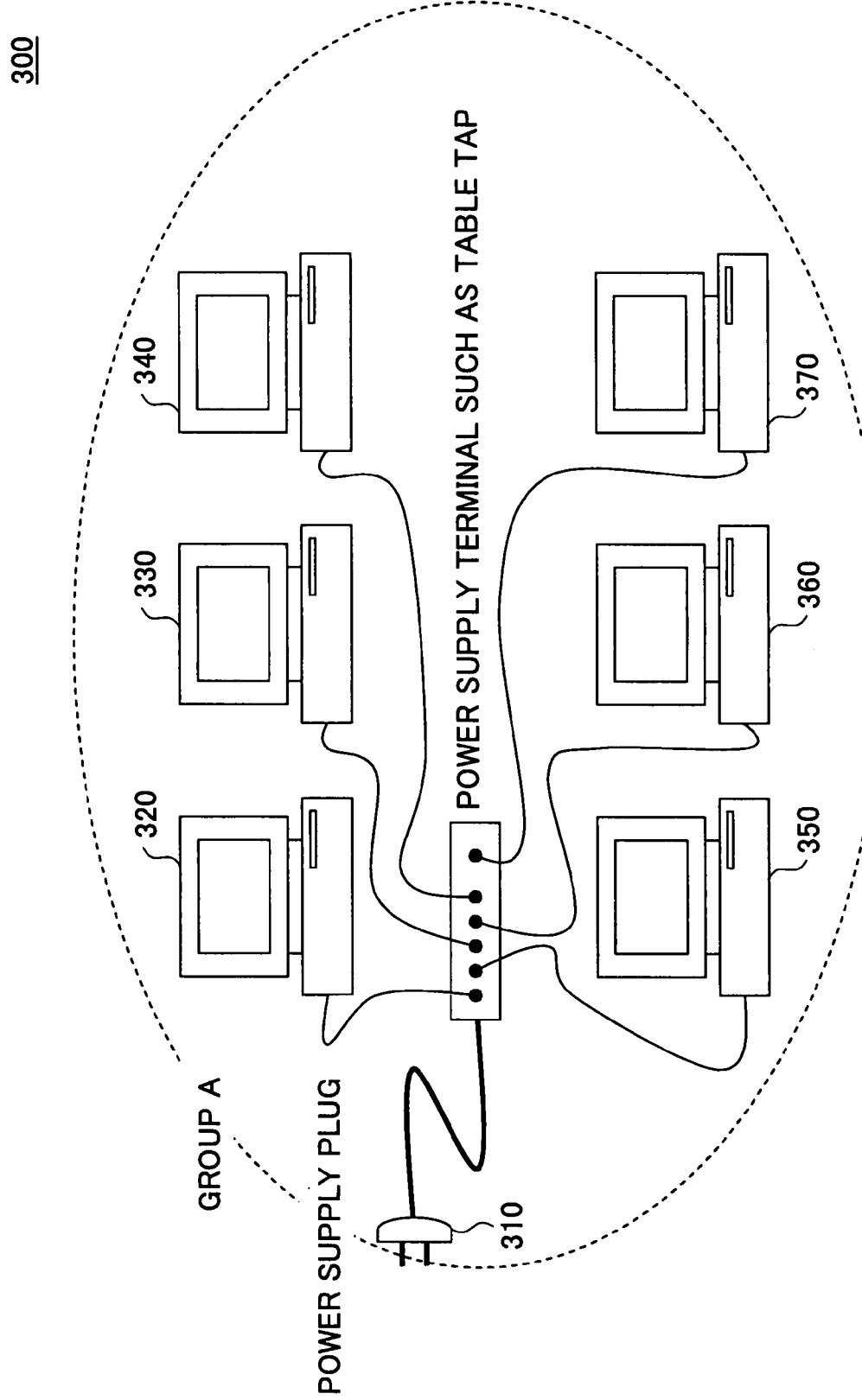
FIG. 3 is a schematic view for explaining a starting method of an electronic apparatus of a first embodiment of the present invention.

FIG. 3 is a schematic view for explaining a starting method of an electronic apparatus of a first embodiment of the present invention.

In a computer system shown in FIG. 3, plural computers (hereinafter PCs) 320, 330, 340, 350, 360, and 370 are connected as electronic apparatuses to a single power supply plug 310. The power supply plug 310 is connected to, for example, a power supply box having a power supply switch or in-room receptacle. The power supply plug 310 supplies the power supply to the PCs 320, 330, 340, 350, 360, and 370.

In the computer system 300, each of the PCs communicates with the other PCs at the corresponding times of starting so as to confirm the connection.

Therefore, in a case where the power supply is started at the PCs in order with time differences, if a PC where a power supply is started and operations are started earlier communicates with a PC where a power supply is not yet started and operations are not yet started, a communication error may be generated so that the system may not be operating properly.

In addition, if the number of connected PCs is large, the time difference between starting the power supply of a first PC and starting the power supply of a last PC becomes large so that a problem may be generated in the operations of the system.

In order to solve the above-mentioned problems, in this embodiment, PCs 320, 330, 340, 350, 360, and 370 comprises a Group A. Details of the PC 320 are discussed below as representative.

Figure 4:
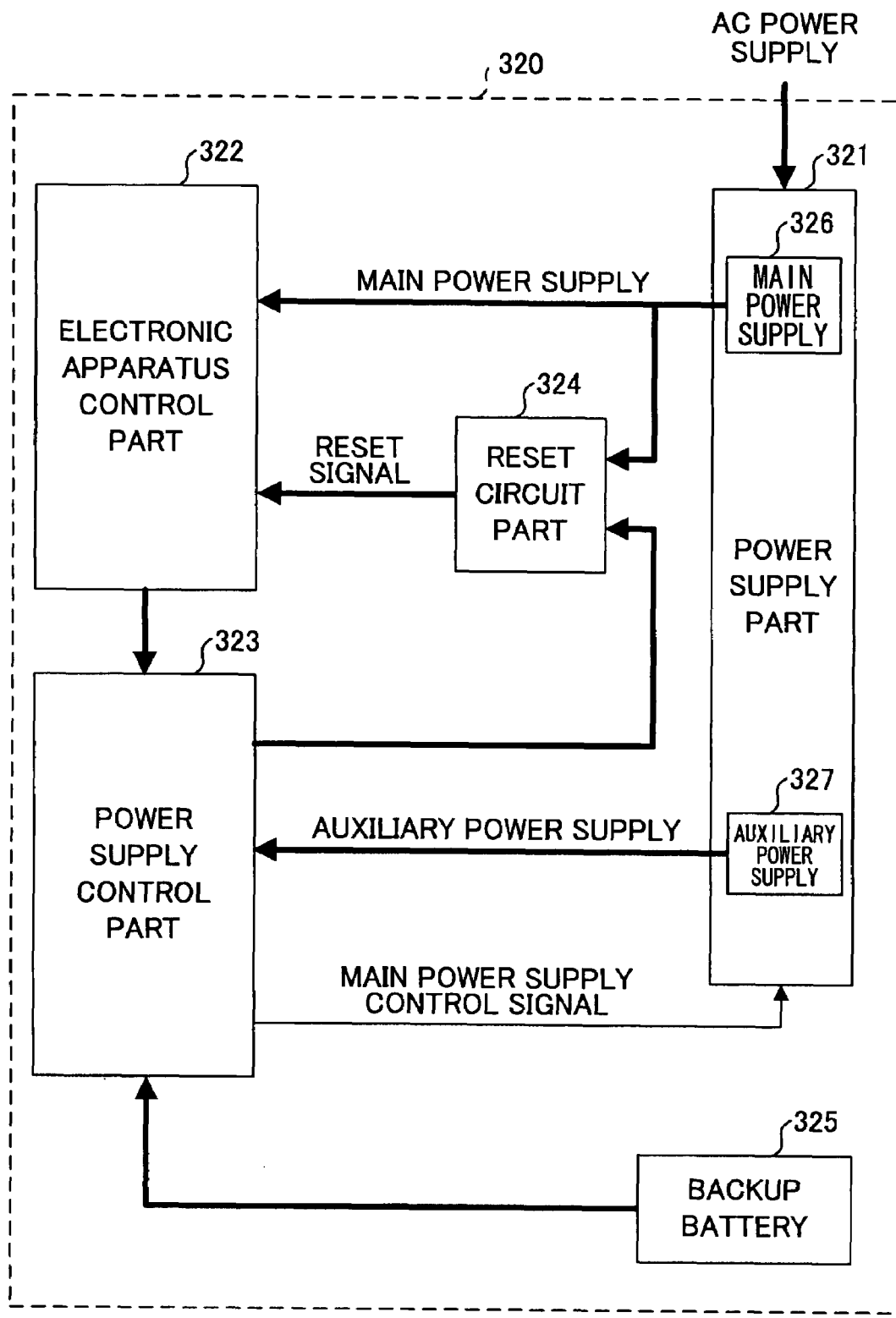
FIG. 4 is a functional block diagram of a PC 320 as the electronic apparatus.

FIG. 4 is a functional block diagram of the PC 320 as the electronic apparatus.

As shown in FIG. 4, the PC 320 includes a power supply part 321, an electronic apparatus control part 322, a power supply control part 323, a reset circuit part 324, and a backup battery 325.

The PC 320 includes a display part and an input part (not shown). Operations of the PC 320 are controlled by the electronic apparatus control part 322. The electronic apparatus control part 322 operates so that the PC 320 functions as a personal computer.

The power supply part 321 is, for example, a direct-current power supply device necessary for the PC 320. The power supply part 321 includes a main power supply 326 and an auxiliary power supply 327.

Starting or shutting off the main power supply 326 is controlled by the power supply control part 323. When the power supply 326 is started, the main power supply 326 is turned on so as to supply the power supply to each of the parts. When the power supply 326 is shut off, the main power supply 326 supplied to each of the parts is turned off.

The auxiliary power supply 327 is necessary for control of starting or shutting off, namely turning ON or OFF the main power supply 326.

The electronic apparatus control part 323 controls processes of the PC 320. The electronic apparatus control part 322 includes a storage device where a program implemented by a CPU (not shown) of the PC 320 is stored and a communication device for communicating with other PCs.

Reset of operations and reset canceling of the electronic apparatus control part 322 are controlled by an output signal of the reset circuit 324. When a signal of low level (hereinafter "L level") is input, the electronic apparatus control part 322 of this embodiment is reset. When a signal of high level (hereinafter "H level") is input, the reset of the electronic apparatus control part 322 is canceled.

The power supply control part 323 outputs a main power supply control signal for starting the main power supply 326 based on a preset designated time. In addition, the power supply control part 323 outputs a synchronizing reset signal based on a preset designated time. The synchronizing reset signal is formed by synchronizing a signal being output from the reset circuit part 324 to the electronic apparatus control part 322.

By controlling the synchronizing reset signal, the output signal of the reset circuit part 324 is controlled, and reset and reset cancel of the electronic apparatus control part 322 are controlled. Details of the electronic apparatus control part 322 are discussed below.

The reset circuit part 324 controls the canceling of the reset of the electronic apparatus control part 322 based on the synchronizing reset signal being output from the power supply control part 323 and a voltage of the main power supply 326. Details of the reset circuit are discussed below.

The backup battery 325 is connected to the power supply control part 323 and holds the setting information stored in the power supply control part 323.

Figure 5:
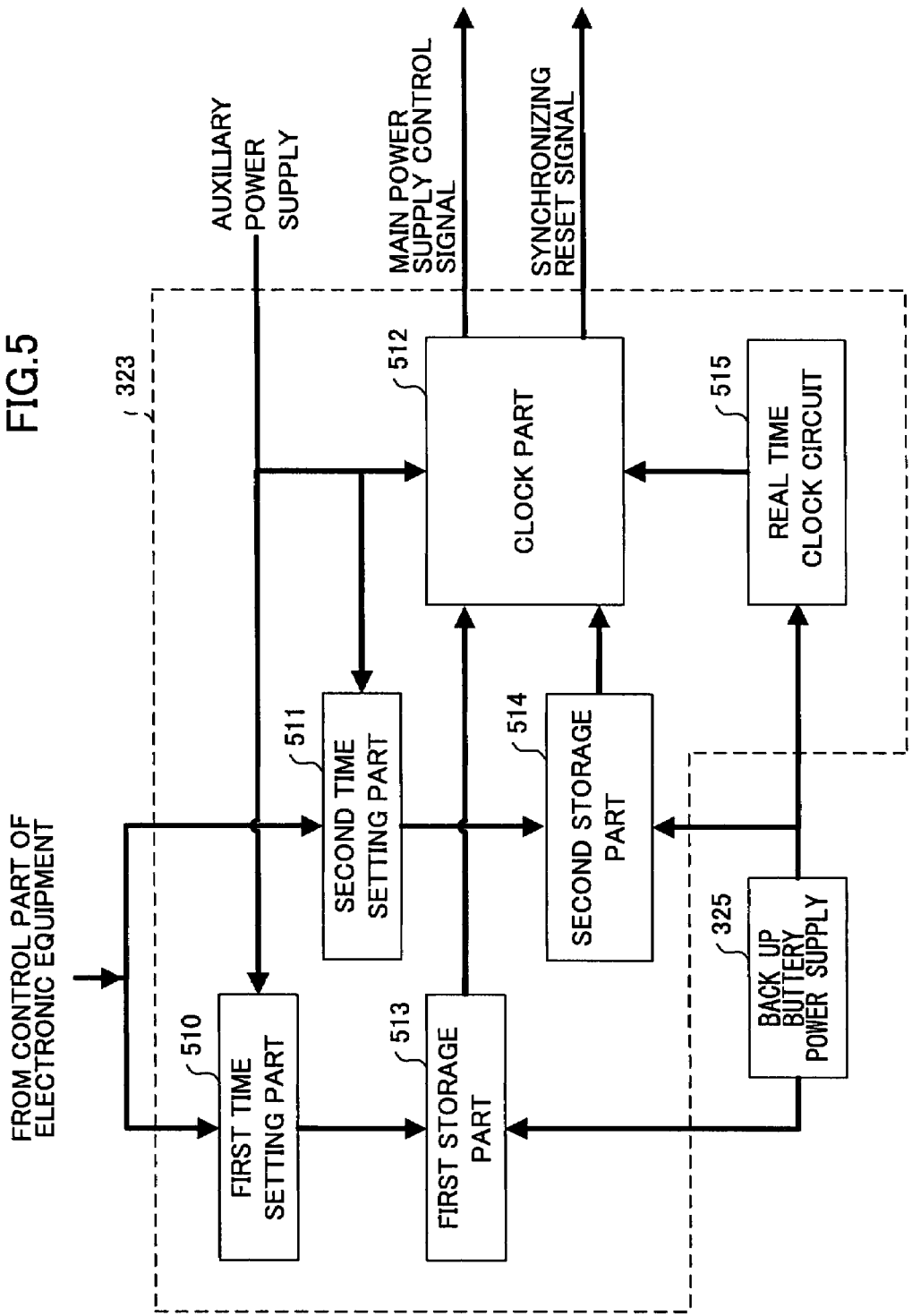
FIG. 5 is a functional block diagram of a power supply control part 323.

Details of the power supply control part 323 are discussed with reference to FIG. 5. Here, FIG. 5 is a functional block diagram of the power supply control part 323.

The power supply control part 323 includes a first designated time setting part 510, a second designated time setting part 511, a clock part 512, a first designated time storage part 513, a second designated time storage part 514, and a real time clock circuit 515.

The first designated time setting part 510, the second designated time setting part 511, and the clock part 512 are operated by a power supply supplied by an auxiliary power supply 327. The first designated time storage part 513, the second designated time storage part 514 and the real-time clock circuit 515 operate on power supplied by a backup battery 325.

The first time setting part 510 sets a first designated time from starting the auxiliary power supply 327 to starting the electronic apparatus control part 322 by a setting instruction from the electronic apparatus control part 322. The second time setting part 511 sets a second designated time from starting the auxiliary power supply 327 to canceling reset of the electronic apparatus control part 322 by a setting instruction from the electronic apparatus control part 322.

The first designated time having been set by the first time setting part 510 is stored in the first storage part 513. The second designated time having been set by the second time setting part 511 is stored in the second storage part 514. Details of setting the first designated time and the second designated time are discussed below with reference to drawings.

The clock part 512 counts a time until the first designated time passes after the starting of the auxiliary power supply 327, based on the first designated time stored in the first storage part 513 and the real time clock circuit 515. After the first designated time passes, the power supply control part 323 sends the main power supply control signal for starting the power supply 326 to the power supply part 321.

In addition, the clock part 512 counts a time until the second designated time passes after starting the auxiliary power supply 327, based on the second designated time stored in the second storage part 514 and the real time clock circuit 515. After the second designated time passes, the power supply control part 323 sends the synchronizing reset signal for canceling the reset of the electronic apparatus control part 322 to the reset circuit part 324.

Figure 6:
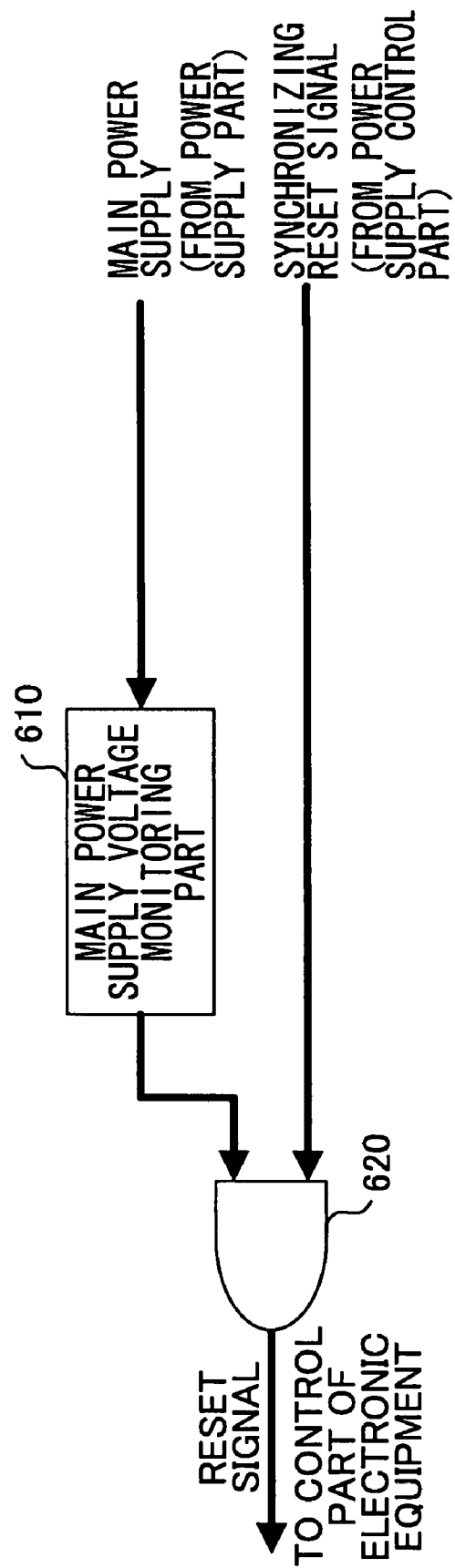
FIG. 6 is a schematic circuit diagram of a reset circuit part 324.

Next, the reset circuit part 324 is discussed with reference to FIG. 6. Here, FIG. 6 is a schematic circuit diagram of the reset circuit part 324.

The reset circuit part 324 includes a main power supply voltage monitoring part 610 and an AND circuit 620.

The main power supply voltage monitoring part 610 monitors a voltage of the main power supply 326 being output from the power supply part 321. In the main power supply voltage monitoring part 610, the main power supply 326 is started and a signal of an H level is output when the supplying of a normal power supply voltage is detected.

In the AND circuit 620, an output signal of the main power supply voltage monitoring circuit 610 and the synchronizing reset signal being output from the power supply control part 323 are input and a logical sum of the output signal and the synchronizing reset signal is an output signal of the reset circuit 322.

Next, operations of the PC 320 are discussed with reference to FIG. 7. Here, FIG. 7 is a flowchart for explaining operations of the PC 320 of the first embodiment of the present invention.

Figure 7:
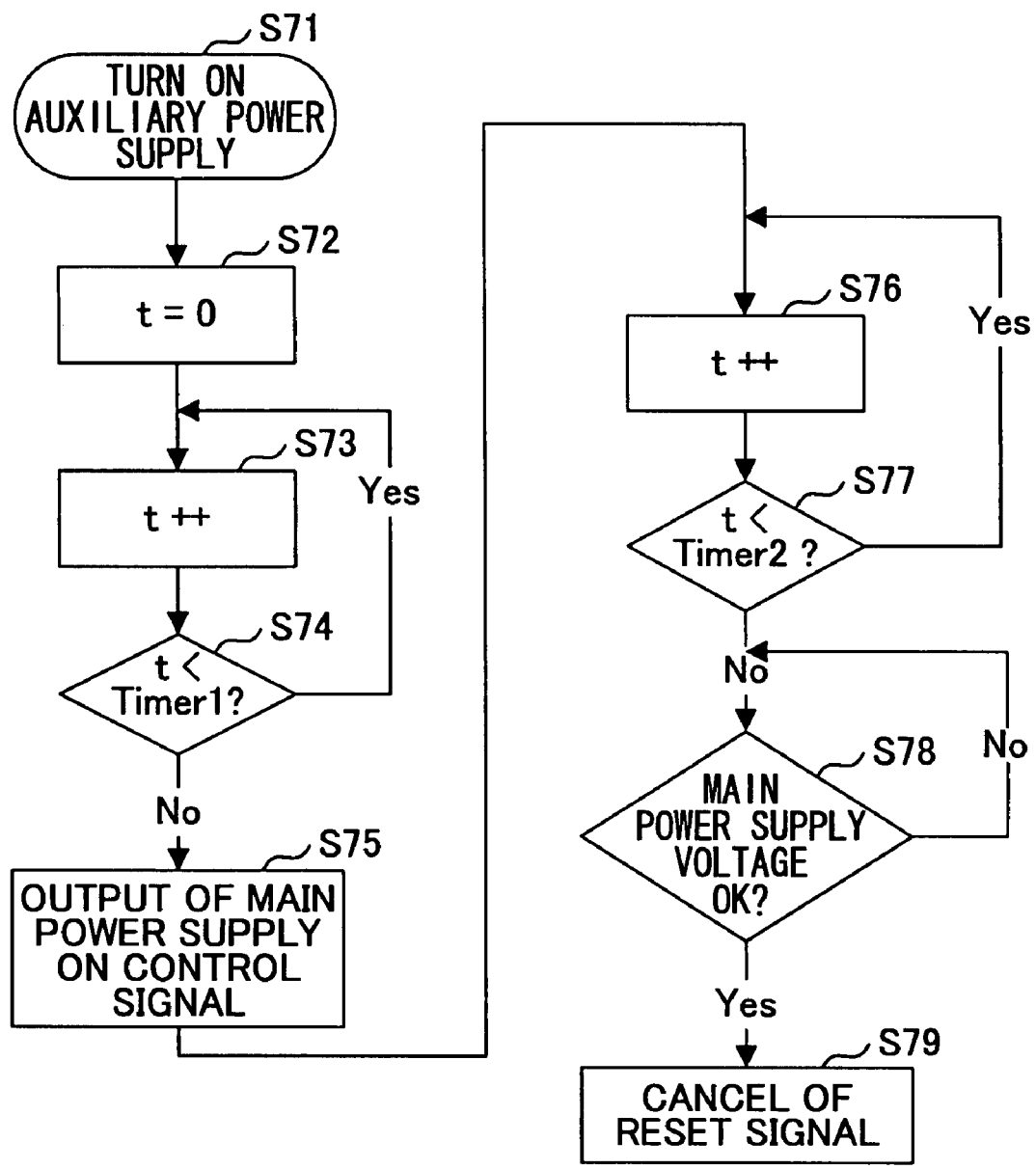
FIG. 7 is a flowchart for explaining operations of the PC 320 of the first embodiment of the present invention.

Referring to FIG. 7, in step S71, in the PC 320, when the power supply such as an AC power supply is supplied from the outside to the power supply part 321, the power supply part 321 immediately starts the auxiliary power supply 327 and outputs the auxiliary power supply 327 to the power supply control part 323. The power supply control part 323 to which the auxiliary power supply 327 is supplied outputs an L level synchronizing reset signal to the reset circuit 324.

In the reset circuit 324, a logical sum of the synchronizing reset signal of this L level and the output signal of the main power supply voltage monitoring part 610 is the output signal of the reset circuit part 324. At this time, since the main power supply 326 is not yet operating, the output signal of the main power supply voltage monitoring part 610 is the L level.

Therefore, the output signal of the reset circuit 324 is the L level. The electronic apparatus control part 322 is placed in a reset state by the reset signal of this L level.

In the power supply control part 323, when the auxiliary power supply 327 is supplied, counting of time is started in step S72 in order to determine in the clock part 512 whether the first designated time stored in the first storing time 511 has passed. The counting of the time is continued in step S73 until the first designated time passes.

When the count of the first designated time in the clock part 512 is finished in step S74, the power supply control part 323 outputs the main power supply control signal to the power supply part 321 so as to start the main power supply 326 in step S75. The power supply part 321 receiving this main power supply control signal starts the main power supply 326 so that the power supply is started being supplied to the electronic apparatus control part 322 and the reset circuit part 324.

After the first designated time passes, the clock part 512 of the power supply control part 322 continues counting the time in step S76 until the second designated time stored in the second storage part passes after supplying the auxiliary power supply 327.

When counting of the second designated time is finished in the clock part 512 in step S77, the power supply control part 323 outputs a signal for canceling rest of the electronic apparatus control part 322, namely the synchronizing reset signal of the H level, to the reset circuit part 324.

In the reset circuit part 324, supply of a normal power supply voltage is detected by the main power supply voltage monitoring part 610 in step S78. In addition, the reset circuit part 324 receiving the synchronizing reset signal of the H level outputs a signal for canceling the reset of the electronic apparatus control part 322, namely a reset signal of the H level, in step S79.

Reset of the electronic apparatus control part 322 is canceled by the reset canceling signal so that the electronic apparatus control part 322 starts operations.

When the electronic apparatus control part 322 starts operations, each process in the PC 320 can be implemented.

Here, each of the processes may be based on execution of a program used in the computer system discussed with reference to FIG. 3, for example.

Figure 8:
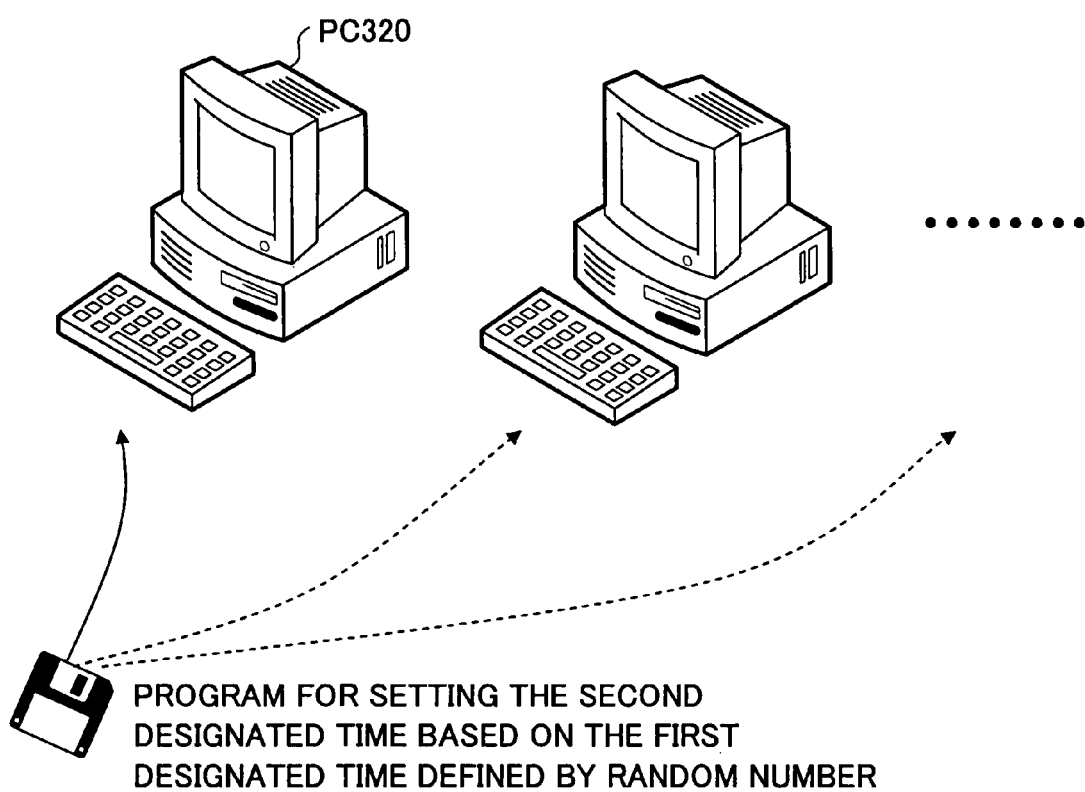
FIG. 8 is a first schematic view for explaining setting of a first designated time and a second designated time.
Figure 9:
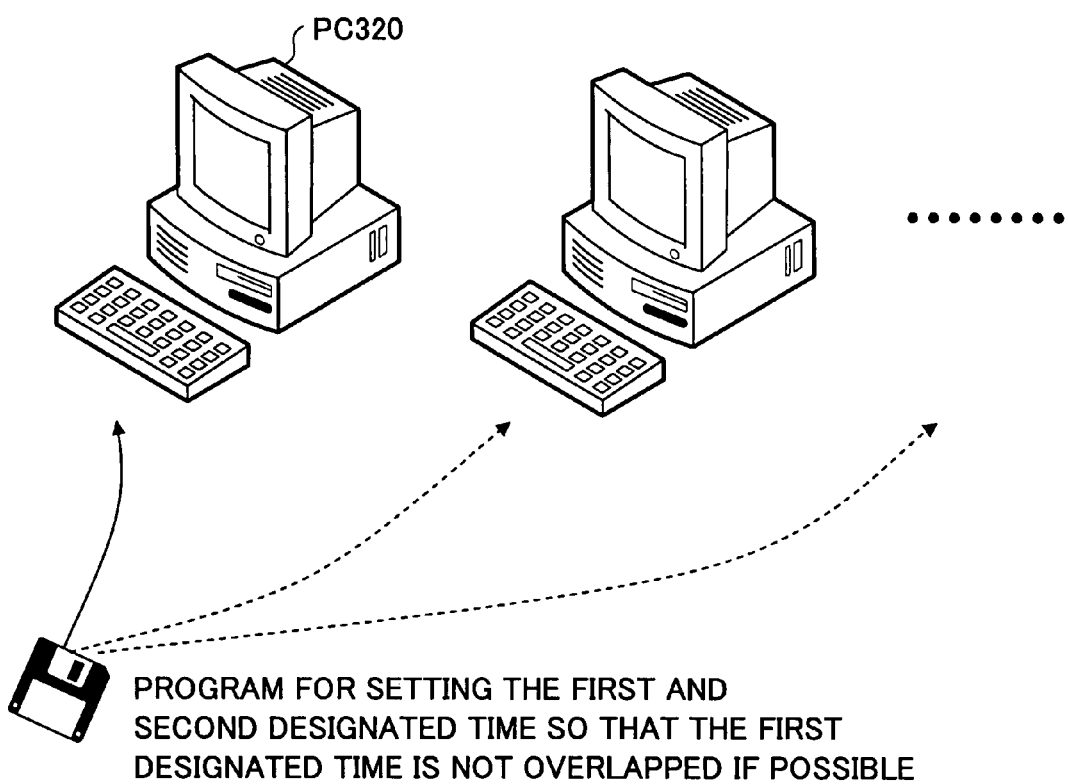
FIG. 9 is a second schematic view for explaining setting of a first designated time and a second designated time.
Figure 10:
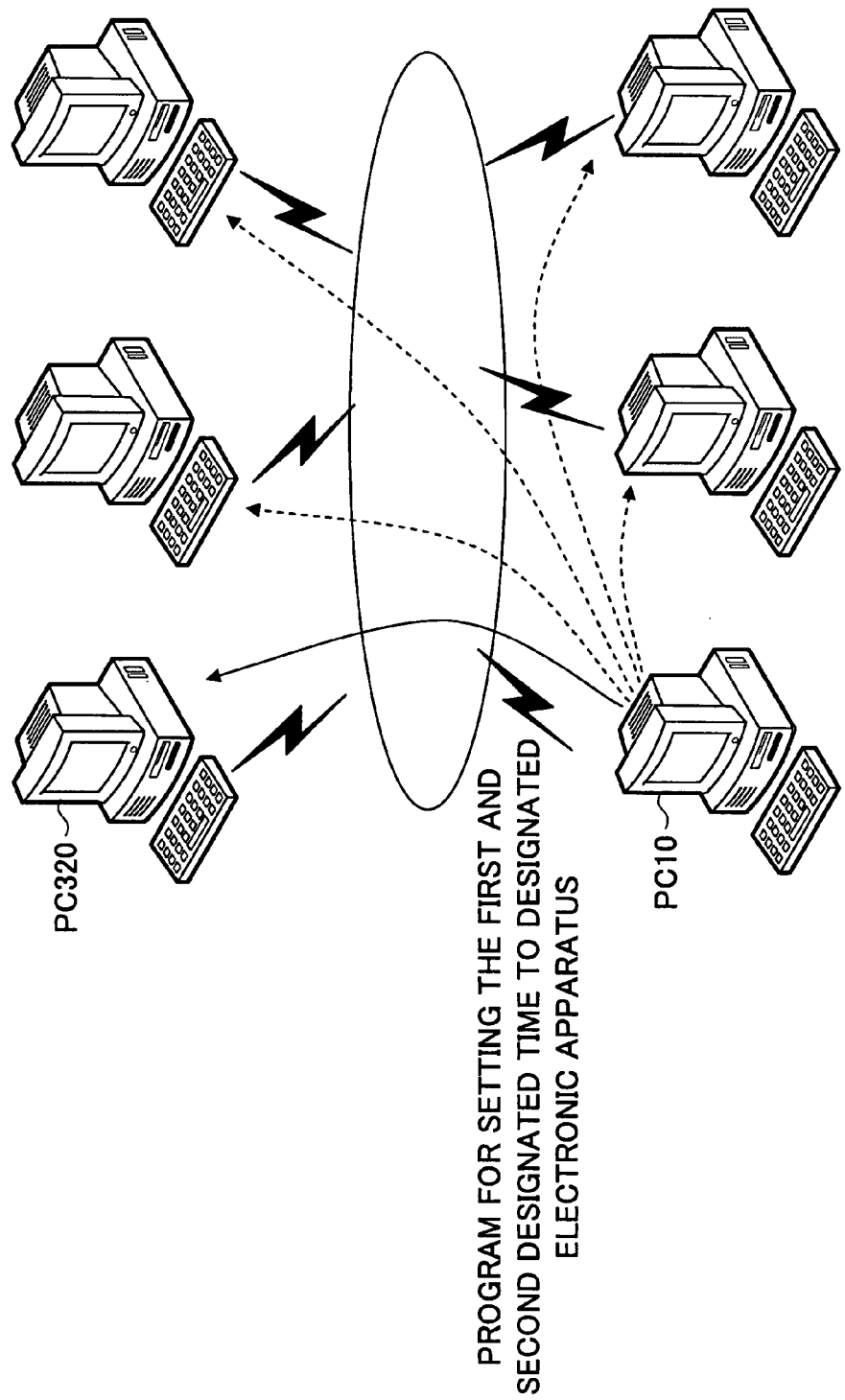
FIG. 10 is a third schematic view for explaining setting of a first designated time and a second designated time.

Here, setting the first designated time and the second designated time is discussed with reference to FIG. 8 through FIG. 10. FIG. 8 is a first schematic view for explaining setting a first designated time and a second designated time. FIG. 9 is a second schematic view for explaining setting the first designated time and the second designated time. FIG. 10 is a third schematic view for explaining set of a first designated time and a second designated time.

In the PC 320 that is an electronic apparatus of this embodiment, as shown in FIG. 8, the first designated time determined by using a random number at the time of shipping from a factory may be set. In this case, in the PC 320, the second designated time may be set based on the first designated time so that reset of the PC 320 is canceled simultaneously with other electronic apparatuses when the PC 320 is provided under a usage environment. A setting program for setting the second designated time may be implemented by the PC 320 so that the second designated time may be set.

Furthermore, in the PC 320 that is an electronic apparatus of this embodiment, as shown in FIG. 9, a time setting program may be installed. In the example shown in FIG. 9, when the PC 320 is provided under a usage environment, the time setting program is started by the PC 320. In the PC 320, by this time setting program, the first designated time and the second designated time are set so that timings when the main power supply of the PC 320 and other electronic apparatuses is started are not overlapped and the reset is canceled simultaneously.

According to the above-mentioned setting method, since the first setting time is set corresponding to the usage environment of the PC 320, it is possible to securely shift timings when the main power supply of the PC 320 and other electronic apparatuses is started. Therefore, compared to the example discussed with reference to FIG. 8, it is possible to avoid unstable operations generated by shift of the starting time of each of the electronic apparatuses with higher probabilities.

Furthermore, in a case where the PC 320 that is an electronic apparatus of this embodiment has a communication part, as shown in FIG. 10, the first designated time and the second designated time may be set via the communication part. In this case, the communication part may use, for example, an Ethernet (registered trademark) type, a serial communication type, or the like.

In the example shown in FIG. 10, the PC 320 is connected to other electronic apparatuses via a network. In the electronic apparatuses connected to the PC 320, a time setting program for calculating the first designated time and the second designate time corresponding to the environment of the network is installed.

Here, plural of the electronic apparatuses where the time setting programs are installed may be provided. A single managing electronic apparatus for managing a network may have the time setting program. In the example shown in FIG. 10, the time setting program is installed in the PC 10.

In the PC 10, the first designated time and the second designated time being set for the PC 320 based on the network environment are calculated. The PC 10 calculates the first designated time and the second designated time so that the timings when the main power supply of the PC 320 and other electronic apparatuses is started are not overlapped, and reset is canceled simultaneously.

The PC 10 sends information related to the calculated first and second designated times to the PC 320. The PC 320 sets the first and second designated times based on this information.

According to the above-mentioned setting method as well as the example shown in FIG. 9, since the first setting time is set corresponding to the usage environment of the PC 320, it is possible to securely shift timings when the main power supply of the PC 320 and other electronic apparatuses is started. Therefore, compared to the example discussed with reference to FIG. 8, it is possible to avoid unstable operations generated by shift of the starting time of each of the electronic apparatuses with higher probabilities.

It is preferable to use, for example, PLC (power-line carrier communication) as a communication method in the example shown in FIG. 10. This method is most proper for a case where the present invention is applied to a closed network formed by electronic apparatuses which are started simultaneously.

In addition, the first and second designated times may be set by not only the setting methods discussed with reference to FIG. 8, FIG. 9 and FIG. 10 but also, for example, inputting an optional value by a user of the PC 320. For example, the optional value is input by the user from the input device such as a keyboard of the PC 320 so that the electronic apparatus control part 322 may send setting instructions to the power supply control part 323 based on the input operations.

When the time information with respect to the first designated time to be set is input, the electronic apparatus control part 322 sends the setting instruction of the first designated time to the first designated time setting part 510. The first designated time setting part 510 sets this time information as the first designated time so as to store the setting information in the first storage part 513.

The second designated time is set in the same way as the first designated time. When the second time setting part 511 receives the setting instruction of the second designated time from the electronic apparatus control part 322, the time information with respect to the second designated time being input by the user is set as the second designated time and this setting information is stored in the second storage part 514.

The first storage part 513 and the second storage part 514 are operated by the backup battery 325. Therefore, even if the power supply supplied from the outside to the PC 320 is shut off and the main power supply 326 and the auxiliary power supply 327 are turned off, the setting information is held in the first storage part 513 and the second storage part 514. Because of this, when the auxiliary power supply 327 is started in the PC 320, the power supply control part 323 can immediately read the first designated time and the second designated time and start counting operations.

Thus, by making the first designated time and the second designated time be capable of optionally being set by the user, in a case where the PC 320 is operated as not one of plural electronic apparatuses connected to the computer system 300 but a single electronic apparatus, it is possible to reduce time for starting the main power supply 326 and starting operations of the PC 320 by setting the first designate time and the second designated time shortly.

The structure of the PC 320 discussed above can be applied to other PCs comprising the computer system 300. The timing for starting each of the PCs in a case where this structure is applied to, for example, a PC 330 and a PC 340 is discussed below.

Figure 11:
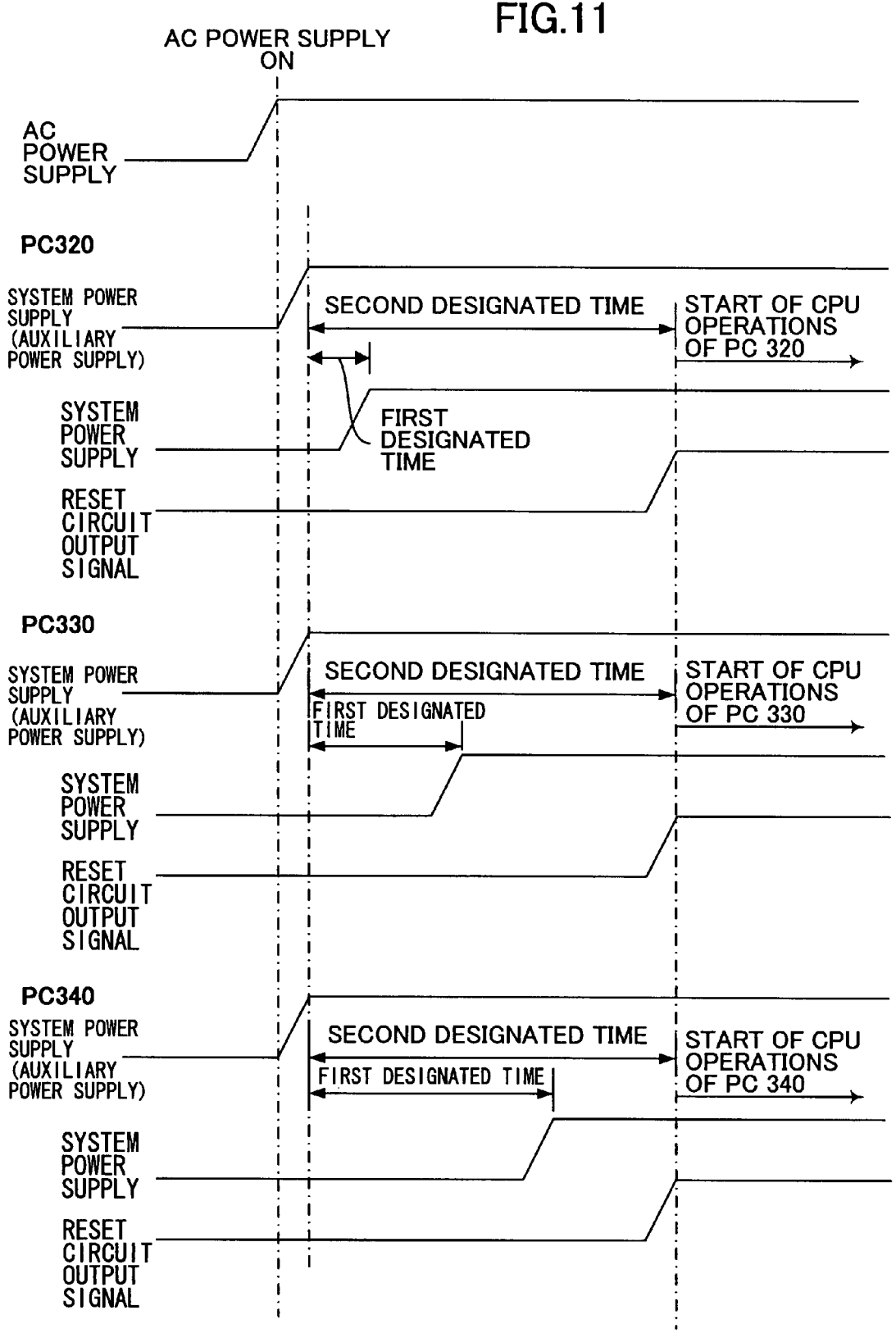
FIG. 11 is a timing chart for explaining timings of starting the PC 320, a PC 330, and a PC 340 of the first embodiment of the present invention.

FIG. 11 is a timing chart for explaining timings of starting the PC 320, the PC 330, and the PC 340 of the first embodiment of the present invention.

In this embodiment, in each of the PCs, the first designated time from start of the auxiliary power supply 327 to start of the main power supply 326 is set as a different time for every PC. The second designated time from the start of the auxiliary power supply 327 to reset of the electronic apparatus control part 322 is set as a constant time.

Under these settings, after the main power supplies of all PCs are started in order, it is possible to simultaneously cancel the rest of the electronic apparatus control part. As a result of this, it is possible to simultaneously start operations of each of the PCs.

As shown in FIG. 11, by gradually making the first designated times set by each of the PCs longer from the first designated time of the PC 320 in order, it is possible to start the main power supply in each of the PCs in order. By setting the second designated time of each of the PCs as a constant time, it is possible to simultaneously cancel resets of the CPU or the like provided in the electronic apparatus control part of each of the PCs so that each of the PCs can start being operated simultaneously.

It is preferable that the second designated time be sufficiently longer than the first designated time. Under this structure, even if the number of the electronic apparatuses connected to the same system power supply is increased, it is possible to increase the number of the electronic apparatuses without newly resetting the second designated time.

By this structure, in the plural electronic apparatuses, it is possible to avoid the unstable operations generated by the time difference of the starting times.

Second Embodiment of the Present Invention

A second embodiment of the present invention is different from the first embodiment of the present invention in that the second designated time is a time from start of the main power supply to a time of canceling the electronic apparatus control part. The structure of the PC 320, 330, 340, 350, 360, and 370 that are the electronic apparatuses are the same as those of the first embodiment. Therefore, counting operations of the second designated time and operations of the PC 320 are mainly discussed here.

Figure 12:
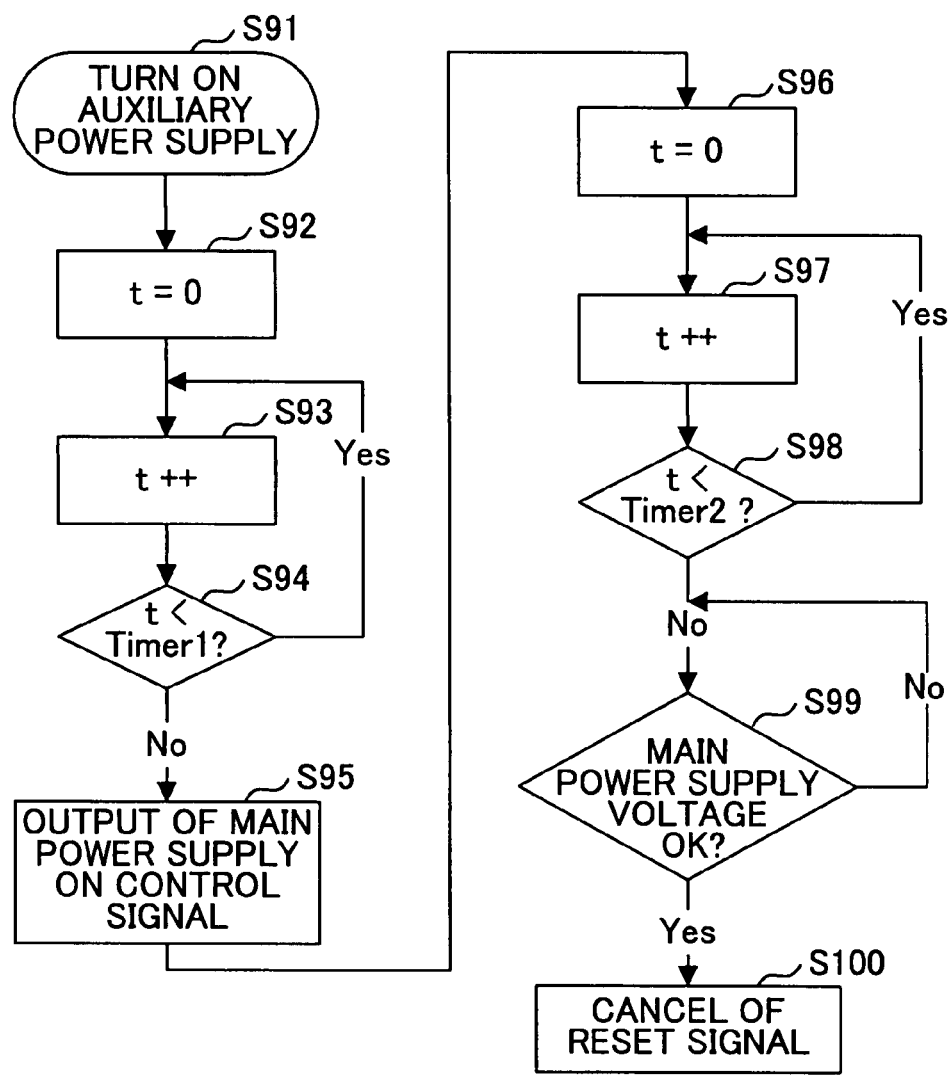
FIG. 12 is a flowchart for explaining operations of the PC 320 of the second embodiment of the present invention.

FIG. 12 is a flowchart for explaining operations of the PC 320 of the second embodiment of the present invention.

Referring to FIG. 12, in step S91, in the PC 320, when the power supply such as an AC power supply is supplied from an outside to the power supply part 321, the power supply part 321 immediately starts the auxiliary power supply 327 and outputs the auxiliary power supply 327 to the power supply control part 323. The power supply control part 323 to which the auxiliary power supply 327 is supplied outputs an L level synchronizing reset signal to the reset circuit 324.

In the reset circuit 324, a logical sum of the synchronizing reset signal of this L level and the output signal of the main power supply voltage monitoring part 610 is the output signal of the reset circuit part 324. At this time, since the main power supply 326 is not yet operating, the output signal of the main power supply voltage monitoring part 610 is the L level.

Therefore, the output signal of the reset circuit 324 is the L level. The electronic apparatus control part 322 is in a reset state by the reset signal of this L level.

In the power supply control part 323, when the auxiliary power supply 327 is supplied, count of a time is started in step S92 in order to determine in the clock part 512 whether the first designated time stored in the first storing time 511 passes. The count of the time is continued in step S93 until the first designated time passes.

When the count of the first designated time in the clock part 512 is finished in step S94, the power supply control part 323 outputs the main power supply control signal to the power supply part 321 so as to start the main power supply 326 in step S95.

The power supply part 321 receiving this main power supply control signal starts the main power supply 326 so that the power supply is started being supplied to the electronic apparatus control part 322 and the reset circuit part 324.

The clock part 512 finishes counting operations at one time simultaneously with the output of the main power supply control signal and newly starts again counting the second designated time in step S96. The clock part 512 continues counting until the second designated time is finished in step S97.

When counting the second designated time is finished in the clock part 512 in step S98, the power supply control part 232 outputs a signal for canceling reset of the electronic apparatus control part 322, namely the synchronizing reset signal of the H level to the reset circuit part 324.

In the reset circuit part 324, supply of a normal power supply voltage is detected by the main power supply voltage monitoring part 610 in step S99. In addition, the reset circuit part 324 receiving the synchronizing reset signal of the H level outputs a signal for canceling the reset of the electronic apparatus control part 322, namely a reset signal of the H level, in step S100.

In this embodiment, it is preferable that the time of a sum of the first designated time and the second designated time be the same in the PCs 320, 330, 340, 350, 360, and 370. Under this structure, it is possible to simultaneously cancel the resets in each of the PCs so that the same effect as that of the first embodiment can be achieved.

Next, timings of starting each of the PCs in a case where this structure is applied to not only the PC 320 but also, for example, PC 330 and PC 340 are discussed.

FIG. 13 is a timing chart for explaining timings of starting the PC 320, the PC 330, and the PC 340 of the second embodiment of the present invention.

As shown in FIG. 13, by gradually making the first designated time in successive PCs longer, timings when the main power supply is powered on are shifted in order. Here, the second designated time is set so that the sum of the first designated time and the second designated time is constant.

Therefore, in the example shown in FIG. 13, as the first designated time is longer, the second designated time is shorter. Here, for example, if the second designated time is longer than the first designated time, it is possible to start operations of each of the PCs in a more stable state after the main power supply is started in each of the PCs.

Thus, according to the above-discussed embodiments of the present invention, it is possible to provide a starting method of an electronic apparatus wherein power supplies of a plurality of the electronic apparatuses are started in order, the starting method including the steps of: resetting the electronic apparatuses when each of the electronic apparatuses is started; and canceling the resets of the electronic apparatuses at the substantially same time after a power supply started last among power supplies of the plural electronic apparatuses is started.

According to the above-mentioned method, it is possible to avoid unstable operations generated due to shift of starting time of plural electronic apparatuses.

The plural electronic apparatuses may be connected to the same power supply.

According to the above-discussed embodiments of the present invention, it is possible to provide an electronic apparatus, including: a power supply part having a main power supply and an auxiliary power supply; a power supply control part having the auxiliary power supply as a power supply, the auxiliary power supply being configured to control starting or shutting of the main power supply; an electronic apparatus control part configured to control the electronic apparatus; a reset part configured to reset the electronic apparatus control part at the starting time of the auxiliary power supply; and a storage part where a first designated time being set for every electronic apparatus and a second designated time that is the same as that of other electronic apparatuses are stored; wherein the power supply control part starts the main power supply after the first designated time passes from the starting time of the auxiliary power supply; and the reset part cancels the reset after the second designated time passes from the starting time of the auxiliary power supply.

According to the above-mentioned apparatus, after a designated time passes after start of the auxiliary power supply, it is possible to start the operations of the electronic apparatus at the same timing as that of other electronic apparatuses.

The second designated time may be longer than the first designated time.

According to the above-mentioned apparatus, in a case where plural electronic apparatuses are connected to a single power supply, it is possible to increase the number of the electronic apparatuses to be connected without changing setting of the first designated time and the second designated time.

According to the above-discussed embodiments of the present invention, it is possible to provide an electronic apparatus, including: a power supply part having a main power supply and an auxiliary power supply; a power supply control part having the auxiliary power supply as a power supply, the auxiliary power supply being configured to control starting or shutting off the main power supply; an electronic apparatus control part configured to control the electronic apparatus; a reset part configured to reset the electronic apparatus control part at the starting time of the auxiliary power supply; and a storage part where a first designate time being set for every electronic apparatus and a second designated time are stored; wherein the sum of the first designated time and the second designated time is the same as those of other electronic apparatuses; the power supply control part starts the main power supply after the first designated time passes from the starting time of the auxiliary power supply; and the reset part cancels the reset after the second designated time passes from the starting time of the main power supply.

According to the above-mentioned apparatus, after a designated time passes after start of the main power supply, it is possible to start the operations of the electronic apparatus at the same timing as that of other electronic apparatuses.

According to the above-discussed embodiments of the present invention, it is possible to provide a starting method of an electronic apparatus, the electronic apparatus including: a power supply part having a main power supply and an auxiliary power supply; an electronic apparatus control part configured to control the electronic apparatus; and a storage part where a first designated time being set for every the electronic apparatus and a second designate time that is the same as that of other electronic apparatus are stored; the starting method including: a power supply controlling step of controlling starting or shutting off the main power supply; a resetting step of resetting the electronic apparatus control part at the starting time of the auxiliary power supply; wherein, in the power supply controlling step, the main power supply is started after the first designated time passes from the starting time of the auxiliary power supply; and in the resetting step, the reset is canceled after the second designated time passes from the starting time of the auxiliary power supply.

According to the above-mentioned apparatus, after a designated time passes after start of the auxiliary power supply, it is possible to start the operations of the electronic apparatus at the same timing as that of other electronic apparatuses.

The second designated time may be longer than the first designated time.

According to the above-mentioned apparatus, in a case where plural electronic apparatuses are connected to a single power supply, it is possible to increase the number of the electronic apparatuses to be connected without changing settings of the first designated time and the second designated time.

According to the above-discussed embodiments of the present invention, it is possible to provide a starting method of an electronic apparatus, the electronic apparatus including a power supply part having a main power supply and an auxiliary power supply; an electronic apparatus control part configured to control the electronic apparatus; and a storage part where a first designated time being set for every the electronic apparatus and a second designate time that is the same as that of other electronic apparatus are stored; the starting method including: a power supply controlling step of controlling starting or shutting off the main power supply; a resetting step of resetting the electronic apparatus control part at the starting time of the auxiliary power supply; wherein, in the power supply controlling step, the main power supply is started after the first designated time passes from the starting time of the main power supply; and in the resetting step, the reset is canceled after the second designated time passes from the starting time of the auxiliary power supply.

According to the above-mentioned method, after a designated time passes after start of the main power supply, it is possible to start the operations of the electronic apparatus at the same timing as that of other electronic apparatuses.

Thus, the present invention can be applied to an electronic apparatus such as a computer used in a state where plural of the electronic apparatuses are connected and a starting method of the electronic apparatus.

The present invention is not limited to these embodiments, but variations and modifications may be made without departing from the scope of the present invention.

This patent application is based on Japanese Priority Patent Application No. 2006-169431 filed on Jun. 19, 2006 and Japanese Priority Patent Application No. 2007-45693 filed on Feb. 26, 2007, the entire contents of which are hereby incorporated by reference.

What is claimed is:

1. A starting method of an electronic apparatus wherein power supplies of a plurality of the electronic apparatuses are started in order, the starting method comprising the steps of:
resetting the electronic apparatuses when each of the electronic apparatuses is started; and
canceling the resets of the electronic apparatuses at the substantially same time after a power supply started last among power supplies of the plural electronic apparatuses is started.

2. The starting method of an electronic apparatus as claimed in claim 1,
wherein the plural electronic apparatuses are connected to the same power supply.

3. An electronic apparatus, comprising:
a power supply part having a main power supply and an auxiliary, power supply;
a power supply control part having the auxiliary power supply as a power supply, the auxiliary power supply being configured to control starting or shutting of the main power supply;
an electronic apparatus control part configured to control the electronic apparatus;
a reset part configured to reset the electronic apparatus control part at the starting time of the auxiliary power supply; and
a storage part where a first designated time being set for every electronic apparatus and a second designated time that is the same as that of other electronic apparatuses are stored;
wherein the power supply control part starts the main power supply after the first designated time passes from the starting time of the auxiliary power supply; and
the reset part cancels the reset after the second designated time passes from the starting time of the auxiliary power supply.

4. The electronic apparatus as claimed in claim 3,
wherein the second designated time is longer than the first designated time.

5. An electronic apparatus, comprising:
a power supply part having a main power supply and an auxiliary power supply;
a power supply control part having the auxiliary power supply as a power supply, the auxiliary power supply being configured to control starting or shutting off the main power supply;
an electronic apparatus control part configured to control the electronic apparatus;
a reset part configured to reset the electronic apparatus control part at the starting time of the auxiliary power supply; and
a storage part where a first designate time being set for every electronic apparatus and a second designated time are stored;
wherein the sum of the first designated time and the second designated time is the same as those of other electronic apparatuses;
the power supply control part starts the main power supply after the first designated time passes from the starting time of the auxiliary power supply; and
the reset part cancels the reset after the second designated time passes from the starting time of the main power supply.

6. A starting method of an electronic apparatus, the electronic apparatus including:
a power supply part having a main power supply and an auxiliary power supply;
an electronic apparatus control part configured to control the electronic apparatus; and
a storage part where a first designated time being set for every the electronic apparatus and a second designate time that is the same as that of other electronic apparatus are stored;
the starting method comprising:
a power supply controlling step of controlling starting or shutting off the main power supply;
a resetting step of resetting the electronic apparatus control part at the starting time of the auxiliary power supply;
wherein, in the power supply controlling step, the main power supply is started after the first designated time passes from the starting time of the auxiliary power supply; and in the resetting step, the reset is canceled after the second designated time passes from the starting time of the auxiliary power supply.

7. The starting method of the electronic apparatus as claimed in claim 6,
wherein the second designated time is longer than the first designated time.

8. A starting method of an electronic apparatus, the electronic apparatus including
a power supply part having a main power supply and an auxiliary power supply;
an electronic apparatus control part configured to control the electronic apparatus; and
a storage part where a first designated time being set for every the electronic apparatus and a second designatee time that is the same as that of other electronic apparatus are stored;
the starting method comprising:
a power supply controlling step of controlling starting or shutting off the main power supply;
a resetting step of resetting the electronic apparatus control part at the starting time of the auxiliary power supply;
wherein, in the power supply controlling step, the main power supply is started after the first designated time passes from the starting time of the auxiliary power supply; and
in the resetting step, the reset is canceled after the second designated time passes from the starting time of the auxiliary power supply.

\* \* \* \* \*